(12) United States Patent
Winger et al.

(10) Patent No.: US 7,612,828 B2
(45) Date of Patent: Nov. 3, 2009

(54) PROGRESSIVE VIDEO DETECTION WITH AGGREGATED BLOCK SADS

(75) Inventors: Lowell L. Winger, Waterloo (CA); Yunwei Jia, Milton (CA)

(73) Assignee: LSI Corporation, Milpitas, CA (US)

( * ) Notice: Subject to any disclaimer, the term of this patent is extended or adjusted under 35 U.S.C. 154(b) by 784 days.

(21) Appl. No.: 11/355,027

(22) Filed: Feb. 15, 2006

(65) Prior Publication Data

US 2007/0188662 A1 Aug. 16, 2007

(51) Int. Cl.
*H04N 5/253* (2006.01)
*H04N 7/01* (2006.01)

(52) U.S. Cl. .................. 348/449; 348/701; 348/558; 348/448; 348/452; 348/459

(58) Field of Classification Search .......... 348/449, 348/452, 451, 459, 701, 700, 448, 620, 558; 375/240.16, 240.01; 382/236, 275
See application file for complete search history.

(56) References Cited

U.S. PATENT DOCUMENTS 7,468,756 B2 * 12/2008 Wyman ............... 348/558
2007/0002169 A1 * 1/2007 Munsil et al. ........... 348/446

OTHER PUBLICATIONS

Yunwei Jia et al, U.S. Appl. No. 11/272,300, filed Nov. 10, 2005.
Yunwei, Jia et al. U.S. Appl. No. 11/314,631, filed Dec. 20, 2005.
Yunwei Jia et al, U.S. Appl. No. 11/343,119, filed Jan. 30, 2006.

* cited by examiner

*Primary Examiner*—David L Ometz
*Assistant Examiner*—Jean W Désir
(74) *Attorney, Agent, or Firm*—Christopher P. Maiorana, PC

(57) ABSTRACT

A method for detecting progressive material in a video sequence is disclosed. The method generally includes the steps of (A) calculating a plurality of block statistics for each of a plurality of blocks in a current field of the video sequence, (B) calculating a plurality of field statistics by summing the block statistics over all of the blocks in the current field, (C) calculating a noise level for the current field based on a subset of the block statistics from each of the blocks and (D) generating a mode flag for the current field based on both (i) the field statistics and (ii) the noise level, wherein the mode flag identifies if the current field is part of a 2:2 pull-down pattern.

20 Claims, 13 Drawing Sheets if $\max(s_2, s_3) < \min\left(\dfrac{s_0}{3}, \dfrac{s_1}{3}, \dfrac{s_6}{8}, \dfrac{s_7}{8}, \dfrac{s_8}{8}, \dfrac{s_9}{8}\right)$ close_to_stationary = 3    // strong indication of stationary else if $\max(s_2, s_3) < \min\left(\dfrac{2s_0}{3}, \dfrac{2s_1}{3}, \dfrac{s_6}{4}, \dfrac{s_7}{4}, \dfrac{s_8}{4}, \dfrac{s_9}{4}\right)$ close_to_stationary = 2    // weak indication of stationary else if $\max(s_2, s_3) < \min\left(s_0, s_1, \dfrac{s_6}{2}, \dfrac{s_7}{2}, \dfrac{s_8}{2}, \dfrac{s_9}{2}\right)$ close_to_stationary = 1    // very weak indication of stationary else close_to_stationary = 0    // no indication of stationary

FIG. 6 if (current field is a *top* && *inflag*[0]==0 && $s_0$>0)

$$forward = \text{sgn}(s_0 - s_1) * \left(2 * \left(\dfrac{\max(s_0, s_1)}{\min(s_0, s_1)} > \dfrac{16}{13}\right) + \left(\dfrac{\max(s_0, s_1)}{\min(s_0, s_1)} > 2\right)\right)$$

else (current field is a *bottom* && *inflag*[0]==0 && $s_1$>0)

$$forward = \text{sgn}(s_1 - s_0) * \left(2 * \left(\dfrac{\max(s_0, s_1)}{\min(s_0, s_1)} > \dfrac{16}{13}\right) + \left(\dfrac{\max(s_0, s_1)}{\min(s_0, s_1)} > 2\right)\right)$$

else

*forward* = 0

FIG. 8

$$inconsist[0] = \sum_{k=1,3}\left(\text{sgn}(s_0 - s_1) * \text{sgn}(s_1^k - s_0^k) == -1\right)$$
$$+ \sum_{k=2,4}\left(\text{sgn}(s_0 - s_1) * \text{sgn}(s_0^k - s_1^k) == -1\right)$$

$$inconsist[1] = \sum_{k=1,3}\left(\text{sgn}\left(\max(s_6,s_7) - \max(s_8,s_9)\right) * \text{sgn}\left(\max(s_8^k,s_9^k) - \max(s_6^k,s_7^k)\right) == -1\right)$$
$$+ \sum_{k=2,4}\left(\text{sgn}\left(\max(s_6,s_7) - \max(s_8,s_9)\right) * \text{sgn}\left(\max(s_6^k,s_7^k) - \max(s_8^k,s_9^k)\right) == -1\right)$$

$$inconsist[2] = \begin{pmatrix} \text{sgn}(s_7 - s_9) \\ + \sum_{k=1,3} \text{sgn}(s_9^k - s_7^k) * (mnainter * 32 > s_2 + s_3) * (mxainter * 8 > s_2 + s_3) * \left(\frac{mxainter^k}{mnainter^k} < \frac{3}{2}\right) \\ + \sum_{k=2,4} \text{sgn}(s_7^k - s_9^k) * (mnainter * 32 > s_2 + s_3) * (mxainter * 8 > s_2 + s_3) * \left(\frac{mxainter^k}{mnainter^k} < \frac{3}{2}\right) \end{pmatrix} * (top?1:-1)$$

$$inconsist[3] = \begin{pmatrix} \text{sgn}(s_6 - s_8) \\ + \sum_{k=1,3} \text{sgn}(s_8^k - s_6^k) * (mnainter * 32 > s_2 + s_3) * (mxainter * 8 > s_2 + s_3) * \left(\frac{mxainter^k}{mnainter^k} < \frac{3}{2}\right) \\ + \sum_{k=2,4} \text{sgn}(s_6^k - s_8^k) * (mnainter * 32 > s_2 + s_3) * (mxainter * 8 > s_2 + s_3) * \left(\frac{mxainter^k}{mnainter^k} < \frac{3}{2}\right) \end{pmatrix} * (top?1:-1)$$

$$inflag[0] = \sum_{k=1,3}\left(\frac{s_0}{s_1} > \frac{32}{31}\right) * \left(\frac{s_0^k}{s_1^k} > \frac{32}{31}\right) + \left(\frac{s_0}{s_1} < \frac{31}{32}\right) * \left(\frac{s_0^k}{s_1^k} < \frac{31}{32}\right)$$
$$+ \sum_{k=2,4}\left(\frac{s_0}{s_1} > \frac{32}{31}\right) * \left(\frac{s_0^k}{s_1^k} < \frac{31}{32}\right) + \left(\frac{s_0}{s_1} < \frac{31}{32}\right) * \left(\frac{s_0^k}{s_1^k} > \frac{32}{31}\right)$$

$$inflag[1] = \sum_{k=1,3}\left(\frac{\max(s_6,s_7)}{\max(s_8,s_9)} > \frac{32}{31}\right) * \left(\frac{\max(s_6^k,s_7^k)}{\max(s_8^k,s_9^k)} > \frac{32}{31}\right) + \left(\frac{\max(s_6,s_7)}{\max(s_8,s_9)} < \frac{31}{32}\right) * \left(\frac{\max(s_6^k,s_7^k)}{\max(s_8^k,s_9^k)} < \frac{31}{32}\right)$$
$$+ \sum_{k=2,4}\left(\frac{\max(s_6,s_7)}{\max(s_8,s_9)} > \frac{32}{31}\right) * \left(\frac{\max(s_6^k,s_7^k)}{\max(s_8^k,s_9^k)} < \frac{31}{32}\right) + \left(\frac{\max(s_6,s_7)}{\max(s_8,s_9)} < \frac{31}{32}\right) * \left(\frac{\max(s_6^k,s_7^k)}{\max(s_8^k,s_9^k)} > \frac{32}{31}\right)$$

FIG. 7

$iind1 = (scene\_change == 0)$

&& $|inconsist[2] + inconsist[3]| \leq 6$ && $|inconsist[2]| + |inconsist[3]| \geq 8$ && $\left( \begin{array}{l} \left(\text{sgn}(s_6 - s_8) + \text{sgn}(s_7 - s_9) \neq 0 \ \&\& \ \min\left(|s_6^k - s_8^k|, |s_7^k - s_9^k|\right) * \frac{16}{3} < s_2 + s_3\right) \\ \| \ \left(\min\left(|s_6^k - s_8^k|, |s_7^k - s_9^k|\right) * 8 < s_2 + s_3 \ \&\& \ \max\left(|s_6^k - s_8^k|, |s_7^k - s_9^k|\right) * \frac{8}{7} < s_2 + s_3\right) \end{array} \right)$ $iind2 = inconsist[0] == 2 \text{ or } 3$ && $inconsist[1] == 2 \text{ or } 3$ && $\left( \frac{16}{15} \geq \frac{\max(s_6, s_7)}{\max(s_8, s_9)} \geq \frac{15}{16} \right)$ && $\left( \frac{16}{15} \geq \frac{\min(s_6, s_7)}{\min(s_8, s_9)} \geq \frac{15}{16} \right)$ $iind3 = \left( \frac{16}{15} > \frac{s_0}{s_1} > \frac{15}{16} \right)$ && $\left( iind2 \ \| \ (\min(s_2, s_3) > 8 * \max(s_0, s_1)) \right)$ $iind4 = (s_4 * 3 < \min(s_6, s_7))$ && $(s_5 * 3 < \min(s_8, s_9))$

FIG. 9

$pind0 = (scene\_change == 0 \ \&\& \ inflag[1] > 0)$ $\&\& \ \left( \dfrac{\max(s_0, s_1)}{\min(s_0, s_1)} > \dfrac{3}{2} \ \&\& \ \dfrac{\max(\max(s_6, s_7), \max(s_8, s_9))}{\min(\max(s_6, s_7), \max(s_8, s_9))} > \dfrac{16}{15} \right)$ $\| \ \left( \dfrac{\max(s_0, s_1)}{\min(s_0, s_1)} > \dfrac{9}{8} \ \&\& \ \dfrac{\max(\max(s_6, s_7), \max(s_8, s_9))}{\min(\max(s_6, s_7), \max(s_8, s_9))} > \dfrac{16}{14} \ \&\& \ |inconsist[2] + inconsist[3]| > 0 \right)$ $pind1 = (scene\_change != 0)$ $\&\& \ ( \quad |inconsist[2] + inconsist[3]| \geq 8)$ $\| \ \begin{pmatrix} \left| inconsist[2] + inconsist[3] - \left( \text{sgn}(s_6^k - s_8^k) + \text{sgn}(s_7^k - s_9^k) \right) * \left( \dfrac{\max\left( |s_6^k - s_8^k|, |s_7^k - s_9^k| \right)}{\min\left( |s_6^k - s_8^k|, |s_7^k - s_9^k| \right)} < \dfrac{3}{2} \right) \right| > 0 \\ \&\& \ 8*|s_6 + s_7 - s_8 + s_9| > 5*(s_2 + s_3) \\ \&\& \ \begin{pmatrix} \text{sgn}(s_6 - s_8) + \text{sgn}(s_7 - s_9) != 0 \ \&\& \ 8*\min\left( |s_6^k - s_8^k|, |s_7^k - s_9^k| \right) > 5*(s_2 + s_3) \\ \| \ 8*\max\left( |s_6^k - s_8^k|, |s_7^k - s_9^k| \right) > 7*(s_2 + s_3) \end{pmatrix} \end{pmatrix}$ $pind2 = (scene\_change != 0) \ \&\& \ (inflag[1] != 0) \ \&\& \ \left( \dfrac{\max(\max(s_6, s_7), \max(s_7, s_9))}{\min(\max(s_6, s_8), \max(s_7, s_9))} > \dfrac{16}{13} \right)$ $pind3 = (scene\_change != 0) \ \&\& \ (inflag[1] != 0) \ \&\& \ \left( \dfrac{\max(s_0, s_1)}{\min(s_0, s_1)} > 4 \right)$

FIG. 10

```
if    (motion_level>0 || close_to_stationary >1)   p_flag = 2*(pind0+pind2+pind3) + pind1;
else                                                p_flag = 4*(pind0+pind2+pind3) + 2*pind1;

if      (motion_level && close_to_stationary>1)    i_flag = iind2 + iind3 + iind1 + iind4;
else if (motion_level>0 || close_to_stationary>2)  i_flag = 2*(iind2 + iind3 + iind4) + iind1;
else                                                i_flag = 4*(iind2 + iind3 + iind4) + iind1;

phist = p_flag + p_flag[-1] + p_flag[-2] + p_flag[-3] + p_flag[-4];
ihist = i_flag + i_flag[-1] + i_flag[-2] + i_flag[-3] + i_flag[-4];
zcp   = !p_flag[-1] + !p_flag[-2] + !p_flag[-3] + !p_flag[-4];
zci   = !i_flag[-1] + !i_flag[-2] + !i_flag[-3] + !i_flag[-4];
ax    = min(phist[-k] - ihist[-k], k=1,2,3,4);
bx    = max(phist[-k] - ihist[-k], k=1,2,3,4);

if (current_state == INTERLACED)
{
        if (     (p_hist-i_hist>15    &&    zci-zcp>=2)
           &&  ((sadvarflag && (p_flag>i_flag+1) && (i_hist<=5) && (ax>=10) )
           || (sadvarflag && (p_flag>i_flag+2) && (i_hist<=20))
           || ((p_flag>i_flag+4) && (!i_hist) && (p_hist-i_hist>=25))))
        {
                current_state = PROGRESSIVE;
        }
}
if (current_state == PROGRESSIVE)
{
    if(  (sadvarflag && (i_flag>p_flag+1) && (p_hist<=5)  && (i_hist-p_hist>=10) && (bx<=0))
      || (sadvarflag && (i_flag>p_flag+2) && (p_hist<=20) && (i_hist-p_hist>=15))
      || ((i_flag>p_flag+4) && (p_hist<=0)  && (i_hist-p_hist>=25)))
    {
        current_state = INTERLACED;
    }
    else if (   (pre_progfwd!=-1)
           && (|S_forward|≥11 && forward<0 && forward[-k]<0 for k=1, 2, 3, 4)
    {
        progfwd = -1;
    }
    else if (     (prev_progfwd!=1)
           && (|S_forward |≥11 && forward>0 && forward[-k]>0 for k=1,2,3,4)
    {
        progfwd = 1;
    }
    else if ( (!prev_progfwd)
          && ((|forward|≥3 && |S_forward|≥6 && sgn(forward)==sign(tmp0)) || |tmp0|≥10))
    {
        progfwd = sign(tmp0);
    }
}
```

FIG. 11

| Sequence | Number of Fields | Initial False Positive | False Positive |
|---|---|---|---|
| susie (720x480i) | 236 | 10 | 0 |
| diva_death (720x480i) | 838 | 10 | 0 |
| football (720x480i) | 516 | 10 | 0 |
| nba (720x480i) | 194 | 10 | 0 |
| bus (720x480i) | 296 | 10 | 0 |
| bus_noise (720x480i) | 296 | 10 | 0 |
| cheer (720x480i) | 236 | 10 | 0 |
| diva (720x480i) | 236 | 10 | 0 |
| ferris (720x480i) | 236 | 10 | 0 |
| flower (720x480i) | 236 | 10 | 0 |
| kiel (720x480i) | 236 | 10 | 0 |
| popple (720x480i) | 236 | 10 | 0 |
| tempete (720x480i) | 236 | 10 | 0 |
| M&C (720x480i) | 502 | 2 | 0 |
| vqeg13 (720x480i) | 516 | 16 | 0 |
| vqeg14 (720x480i) | 516 | 10 | 0 |
| vqeg20 (720x480i) | 516 | 10 | 0 |
| tempete_vqeg (720x480i) | 516 | 10 | 0 |
| mobile_vqeg (720x480i) | 516 | 10 | 0 |
| tennis (720x480i) | 236 | 10 | 0 |
| wool (720x480i) | 236 | 10 | 0 |
| shinjuku (720x480i) | 236 | 10 | 0 |
| mobile_if (720x480i) | 236 | 10 | 0 |
| mobile_if_noise(720x480i) | 236 | 10 | 0 |
| mobcal_ter (720x576i) | 500 | 32 | 0 |
| F1 (720x576i) | 436 | 10 | 0 |
| shields_ter (720x576i) | 500 | 10 | 0 |
| stockholm_ter (720x576i) | 500 | 10 | 0 |
| parkrun_ter (720x576i) | 500 | 10 | 0 |
| canoe (720x576i) | 436 | 10 | 0 |
| rugby (720x576i) | 436 | 10 | 0 |
| px_D1i (720x480) | 6682 | 13 | 0 |
| 480i30_mobcal_ter (720x480i) | 500 | 36 | 0 |
| shields_ter (1920x1080i) | 500 | 10 | 0 |
| mobcal_ter (1920x1080i) | 500 | 14 | 0 |
| parkrun_ter (1920x1080i) | 500 | 10 | 0 |
| stockholm (1920x1080i) | 500 | 10 | 0 |
| fireworks (1920x1088i) | 116 | 10 | 0 |
| asakusa (1920x1088i) | 116 | 10 | 0 |
| crossroad (1920x1088i) | 116 | 10 | 0 |
| duck (1920x1088i) | 116 | 10 | 0 |
| flamingo (1920x1088i) | 116 | 10 | 0 |
| kayak (1920x1088i) | 116 | 10 | 0 |
| mountain (1920x1088i) | 116 | 10 | 0 |
| running (1920x1088i) | 116 | 10 | 0 |

FIG. 12

| Sequence | Number of Fields | Initial False Negative | False Negative |
|---|---|---|---|
| SPR1 (720x480p) | 2984 | 18 | 0 |
| SPR2 (720x480p) | 2996 | 28 | 0 |
| BL_smoke (720x480p) | 396 | 18 | 0 |
| SST (720x480p) | 1972 | 22 | 0 |
| SST20 (720x480p) | 2014 | 22 | 0 |
| SST21 (720x480p) | 2070 | 18 | 0 |
| SST22 (720x480p) | 2004 | 26 | 0 |
| SST23 (720x480p) | 2026 | 18 | 0 |
| SST24 (720x480p) | 2004 | 18 | 0 |
| cyclists (1280x720p) | 1196 | 18 | 0 |
| harbor (1280x720p) | 1196 | 18 | 0 |
| optis (1280x720p) | 1196 | 18 | 0 |
| raven (1280x720p) | 1196 | 18 | 0 |
| night (1280x720p) | 916 | 18 | 0 |
| sunflower (1920x1080p) | 996 | 18 | 0 |
| rush_hour (1280x720p) | 996 | 18 | 0 |
| river_bet (1280x720p) | 496 | 18 | 0 |
| twister (720x480p) | 4922 | 90 | 0 |
| twister_letterbox (720x480p) | 4924 | 42 | 0 |
| BL_13_0 (720x480p) | 7204 | 28 | 360 |
| BL_13_1 (720x480p) | 4398 | 190 | 36 |
| BL_20_0 (720x480p) | 5732 | 750 | 0 |
| BL_20_1 (720x480p) | 8232 | 18 | 42 |
| BL_21_0 (720x480p) | 2220 | 18 | 404 |
| BL_21_1 (720x480p) | 7236 | 18 | 934 |
| mobcal_ter (1280x720p) | 1004 | 330 | 0 |
| parkrun_ter (1280x720p) | 1004 | 20 | 294 |
| shields_ter (1280x720p) | 1004 | 20 | 66 |
| stockholm_ter (1280x720p) | 1004 | 20 | 60 |
| city (1280x720p) | 1796 | 1796 | 0 |
| creq (1280x720p) | 1196 | 158 | 0 |
| preakness (1280x720p) | 1196 | 1196 | 0 |
| sailorman (1280x720p) | 1196 | 18 | 0 |
| sheriff (1280x720p) | 1196 | 18 | 0 |
| shuttle_start (1280x720p) | 1196 | 470 | 20 |
| big_ship (1280x720p) | 1196 | 420 | 0 |
| jets (1280x720p) | 1096 | 18 | 236 |
| panslow (1280x720p) | 1096 | 112 | 0 |
| spincalendar (1280x720p) | 1096 | 18 | 0 |
| blue_sky (1920x1080p) | 496 | 18 | 0 |
| pedestrian_area (1920x1080p) | 746 | 18 | 0 |
| tractor (1920x1080p) | 1518 | 18 | 0 |
| station2 (1920x1080p) | 622 | 18 | 116 |

FIG. 13

| Sequence | Number of Fields | Results |
|---|---|---|
| tissue (interlaced text on film, 720x480) | 1532(-180) | all detected as progressive |
| babe (interlaced moving text over film, 720x576) | > 6000 | mostly detected as progressive |

FIG. 14

PROGRESSIVE VIDEO DETECTION WITH AGGREGATED BLOCK SADS

CROSS REFERENCE TO RELATED APPLICATIONS

This application is related to U.S. patent applications Ser. No. 11/272,300, filed Nov. 10, 2005, Ser. No. 11/314,631, filed Dec. 20, 2005 and Ser. No. 11/343,119, filed Jan. 30, 2006 which are hereby incorporated by reference in their entirety.

FIELD OF THE INVENTION

The present invention relates to inverse telecine generally and, more particularly, to progressive video detection with aggregated block sum-of-absolute-differences.

BACKGROUND OF THE INVENTION

Distinguishing telecined progressive video from normally interlaced video is significant for both video display and video encoding. If a high quality progressive display is intended, a good solution for a telecined progressive source of video is to correctly "weave" together pairs of associated fields for display as individual frames. In contrast, normally interlaced video is de-interlaced for display as a sequence of frames, a process that is not perfect and involves many tradeoffs. For compression, if the format of the video can be correctly discerned and the parity of progressive video identified (i.e., the correct association between a top field and a bottom field of a frame), then compression quality can be much higher by coding the video as natively progressive, instead of individually coding the interlaced fields (which must be done if the progressive format cannot be identified).

Conventional solutions for detecting interlaced fields originating from progressive frames use pixel differences and look for "combing" artifacts in the video. The pixel differences and combing artifacts can distinguish normally interlaced video from telecined progressive video. In addition, combing artifacts are found in frames formed from the two possible different woven combinations of fields (i.e., a top field with a next bottom field and the top field with a previous bottom field, respectively) to correctly identify the parity of a progressive video source.

The conventional solutions are easily fooled by vertical motion and/or by low motion. In such cases, the combing artifacts do not always appear in interlaced material. Therefore, the conventional solutions sometimes incorrectly identify an interlaced source as a progressive source and/or are unable to discern the correct parity of a progressive source in the absence of horizontal motion. In addition, the conventional solutions have difficulty with material having significant vertical details (i.e., high vertical frequency material), which are often incorrectly classified as combing artifacts, leading to false positives and negatives.

SUMMARY OF THE INVENTION

The present invention concerns a method for detecting progressive material in a video sequence. The method generally comprises the steps of (A) calculating a plurality of block statistics for each of a plurality of blocks in a current field of the video sequence, (B) calculating a plurality of field statistics by summing the block statistics over all of the blocks in the current field, (C) calculating a noise level for the current field based on a subset of the block statistics from each of the blocks and (D) generating a mode flag for the current field based on both (i) the field statistics and (ii) the noise level, wherein the mode flag identifies if the current field is part of a 2:2 pull-down pattern.

The objects, features and advantages of the present invention include providing progressive video detection with aggregated block sum-of-absolute-differences that may (i) provide improved 2:2 pull-down performance compared with conventional techniques, (ii) use block sum-of-absolute-difference statistics, (iii) reduce overall system complexity and/ or (iv) provide good performance compared with conventional approaches.

BRIEF DESCRIPTION OF THE DRAWINGS

These and other objects, features and advantages of the present invention will be apparent from the following detailed description and the appended claims and drawings in which:

FIG. 6 is example pseudo code for determining how stationary a picture is in a current field;

FIG. 7 is an example set of equations for calculating multiple intermediate variables used in a decision making process;

FIG. 8 is an example pseudo code for determining a direction variable;

FIG. 9 is an example set of equations for calculating multiple interlacing indicators;

FIG. 10 is an example set of equations for calculating multiple progressive indicators;

FIG. 11 is an example pseudo code for deciding if the current field originated from a progressive material; and FIGS. 12-14 are tables of simulation results for a 2:2 pull-down detection method.

DETAILED DESCRIPTION OF THE PREFERRED EMBODIMENTS

Multiple Sum-of-Absolute-Difference (SAD) calculations may be used for basic statistical computations of blocks (e.g., 8×8 pixels) in a video sequence. Several (e.g., 10) field statistics may be calculated based on the block SADs (e.g., block statistics) for each field in the video sequence. The field statistics generally permit discrimination between progressive material and non-progressive material present in the video. The field statistics may also be used to identify a parity (e.g., an odd parity or an even parity) of the progressive material.

A noise level estimation and a motion level estimation are generally used to classify blocks. The block classifications may be used to control the block statistic contributions to the field statistics. Control of the block statistic contributions may ensure that only significant blocks are used for distinguishing progressive material. The control generally aids in improving the quality of the field statistic metrics used for the discrimination.

Figure 1:
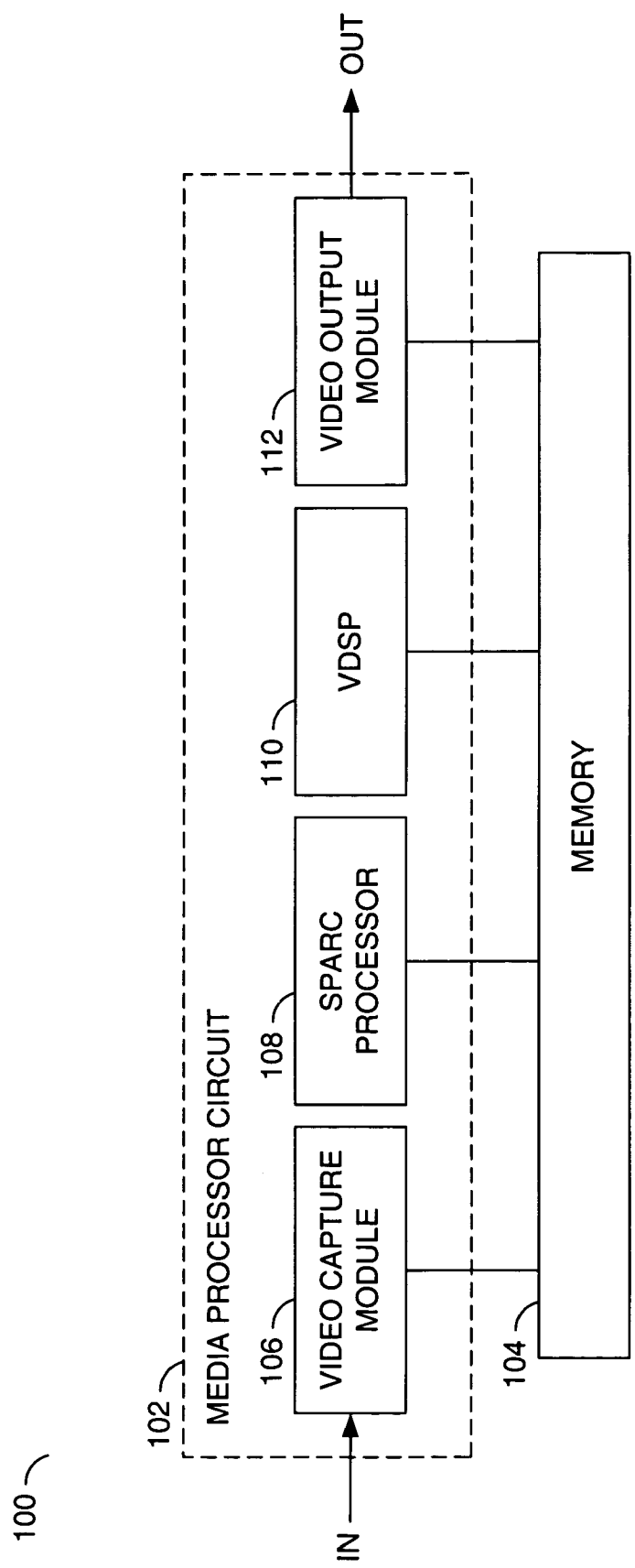
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system (or circuit) 100 may be referred to as a network media system. The network media system 100 generally comprises a circuit (or module) 102 and a circuit (or module) 104. An input signal (e.g., IN) may be received by the circuit 102. The circuit 102 may generate an output signal (e.g., OUT). The circuit 102 may be in communication with the circuit 104 to move video data and video-related information back and forth.

The signal IN may be an analog video signal or a digital video signal that has undergone telecine processing. The signal IN generally comprises a sequence of interlaced-format fields created from a sequence of film frames, a sequence of cartoon frames and/or a normally interlaced material. The signal OUT may be an analog video signal or a digital video signal. The signal OUT generally comprises a sequence of progressive-format frames with some possible interlaced fields mixed within. The frames may be created by inverse telecine processing the interlaced fields received in the signal IN.

The circuit 102 may be referred to as a media processor circuit. The media processor circuit 102 may be operational to gather statistics on the fields from the video signal IN. The media processor circuit 102 may also detect if the fields are in a 3:2 pull-down pattern to control a plurality of 3:2 pull-down flags based on a plurality of statistics gathered from the fields. Simultaneously, the media processor circuit 102 may detect if the fields contain moving interlaced text to control a moving interlaced text flag based on both (i) the statistics and (ii) a repeat-field flag of the 3:2 pull-down flags that indicates a repeating consecutive same polarity field. The media processor may be further configured to detect if the fields are in a 2:2 pull-down pattern based on the statistics to control a plurality of 2:2 pull-down flags. Furthermore, the media processor circuit 102 may decide among a plurality of inverse telecine processes to de-interlace said fields based on all of (i) a 3:2 mode flag, (ii) a 3:2 direction flag, (iii) the moving interlaced text flag, (iv) a 2:2 mode flag and (v) a 2:2 direction flag. A decision may then be made to allocate one or more inverse telecine processes to convert the interlaced fields into frames based on the flags. If the decision is "no weaving", the video out circuit 112 may use other de-interlacing methods to generate progressive frames (e.g., the signal OUT may still carry progressive frames, just not generated from "weaving".) The decision may include a solution not to inverse telecine the fields, thus presenting the interlaced fields in the signal OUT.

The circuit 104 may be referred to as a memory circuit. The memory circuit 104 may be operational to temporarily buffer digital versions of the interlaced fields and digital versions of the progressive frames. The memory circuit 104 may be implemented as a single data rate (SDR) dynamic random access memory (DRAM) or a double data rate (DDR) DRAM. Other memory technologies may be implemented to meet the criteria of a particular application.

The media processor circuit 102 generally comprises a circuit (or module) 106, a circuit (or module) 108, a circuit (or module) 110 and a circuit (or module) 112. The circuit 106 may receive the signal IN. The signal OUT may be generated and presented by the circuit 112. All of the circuits 106, 108, 110 and 112 may be in communication with the memory circuit 104 to read and write video data, video-related information and other data.

The circuit 102 may be referred to as a video capture circuit. The video capture circuit 102 may be operational to capture (e.g., digitize) the interlaced fields from the signal IN. In some embodiments, the video capture circuit 102 may also be operational to gather statistics from the fields of the signal IN.

The circuit 108 may be referred to as a processor circuit. The processor circuit 108 may be operational control the overall operations of the network media system 100. The processor circuit 108 may be implemented as a SPARC processor. Other processor technologies may be implemented to meet the criteria of a particular application.

The circuit 110 may be referred to as a video digital signal processor (VDSP) circuit. The VDSP circuit 110 may be operational to perform high speed processing on the video data. In some embodiments, the VDSP circuit 110 may be operational to gather the statistics from the fields in the signal IN.

The circuit 112 may be referred to as a video output circuit. The video output circuit 112 is generally operational to generate the signal OUT. The video output circuit 112 may include a de-interlacing capability (or block) for generating progressive-format frames. The de-interlacing capability may provide one or more methods (or processes) for de-interlacing the interlaced fields.

Figure 2:
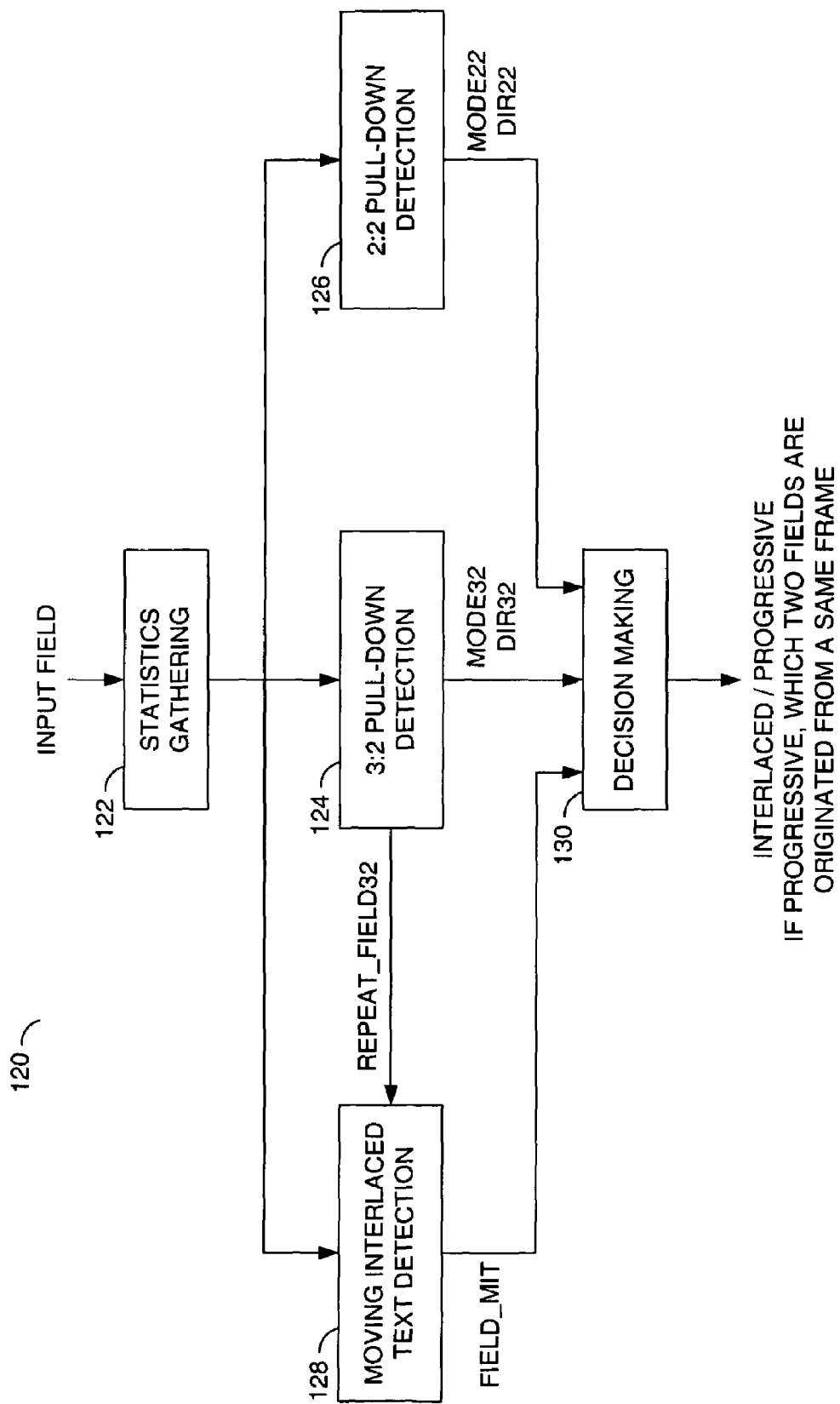
FIG. 2 is a flow diagram of an example method for a unified approach to film mode detection.

Referring to FIG. 2, a flow diagram of an example method 120 for a unified approach to film mode detection is shown. The method (or process) 120 generally comprises a step (or block) 122, a step (or block) 124, a step (or block) 126, a step (or block) 128 and a step (or block) 130.

For each input field received in the input signal IN, the video capture module 106 and/or the VDSP circuit 110 may gather (or calculate) statistics from the fields in the step 122. The statistics may be used by other steps to decide how to covert the fields into frames for the output signal OUT. Further details regarding the statistics are generally provided below.

Based on the gathered statistics, a 3:2 pull-down detection may be performed by the VDSP circuit 110 in the step 124. The detection may determine whether or not a regular 3:2 pull-down pattern exists in the input field sequence. The VDSP circuit 110 may generate one or more binary 3:2 pull-down flags (e.g., a telecine mode flag MODE32, a direction flag DIR32 and a repeated field flag REPEAT_FIELD32) as a result of the detection operation. When the flag MODE32 is asserted (e.g., a logical one or boolean true), the detected sequence is locked into the 3:2 pull-down mode. If the flag MODE32 is de-asserted (e.g., a logical zero or boolean false), the 3:2 pull-down mode has not been detected. In a case where MODE32 is asserted and DIR32 has a reverse direction (e.g., a logical one or "1"), the current field (e.g., $f_N$) and a preceding field (e.g., $f_{N-1}$) may have been detected as originating from a same progressive frame. In a case where MODE32 is asserted and DIR32 has a forward direction (e.g., a logical zero or "0") the current field $f_N$ and a next field (e.g., $f_{N+1}$) may have been detected as originating from a same progressive frame. An assertion (e.g., a logical one or boolean true) of the flag REPEAT_FIELD32 generally indicates that the current field $f_N$ has been detected as a repeated field of a previous same-polarity field (e.g., $f_{N-2}$). A de-assertion (e.g., a logical zero of boolean false) of the flag REPEAT_FIELD32 generally indicates that the current field $f_N$ has not been detected as a repeated field. The flag PREPEAT_FIELD32 may be available to the step 128. Further details of the 3:2 pull-down detection may be found in the co-pending U.S. patent application Ser. No. 11/272,300.

Based on the gathered statistics, a 2:2 pull-down detection may be performed by the VDSP circuit 110 in the step 126. The detection may determine whether or not a regular 2:2 pull-down pattern exists in the input field sequence. The VDSP circuit 110 may generate one or more binary 2:2 pull-down flags (e.g., a mode flag MODE22 and a direction flag DIR22) as a result of the detection operation. An assertion (e.g., a logical one or boolean true) of the flag MODE22 generally means that the sequence of fields is locked into the 2:2 pull-down mode. A de-assertion (e.g., a logical zero or boolean false) of the flag MODE22 may indicate that the 2:2 pull-down pattern was not detected. In a case where MODE22 is asserted and DIR22 indicates a reverse direction, the current field $f_N$ and the preceding field $f_{N-1}$ may have been detected as originating from a same progressive frame. In a case where MODE22 is asserted and DIR22 is de-asserted, the current field $f_N$ and the following field $f_{N+1}$ may have been detected as originating from a same progressive frame. Further details of the 2:2 pull-down detection may be found in the co-pending U.S. patent application Ser. No. 11/272,300.

In the step 128, the VDSP circuit 110 may check the fields to determine if moving interlaced text is present. If moving interlaced is detected, the VDSP circuit 110 may also determine (i) if the movement is vertical or horizontal and (ii) if rows or columns contain the moving text as part of the step 128. The VDSP circuit 110 may generate a binary moving interlaced text flag (e.g., FIELD_MIT) as a result of the detection operation. The flag FIELD_MIT generally indicates whether or nor the current field $f_N$ contains moving interlaced text. An assertion (e.g., a logical one or boolean true) of the flag FIELD_MIT generally means that the moving interlaced text has been detected. A de-assertion (e.g., a logical zero or boolean false) of the flag FIELD_MIT generally indicates that no moving interlaced text was detected. Further details of the moving interlaced text detection may be found in the co-pending U.S. patent application Ser. No. 11/343/119.

A final film mode decision is generally made by the VDSP circuit 110 in the step 130 according to a set of rules. The decision may be responsive to the flags MODE32, DIR32, MODE22, DIR22 and FIELD_MIT. Based on the decision, one among a number of inverse telecine processes may be identified to de-interlace the fields back into progressive frames.

Figure 3:
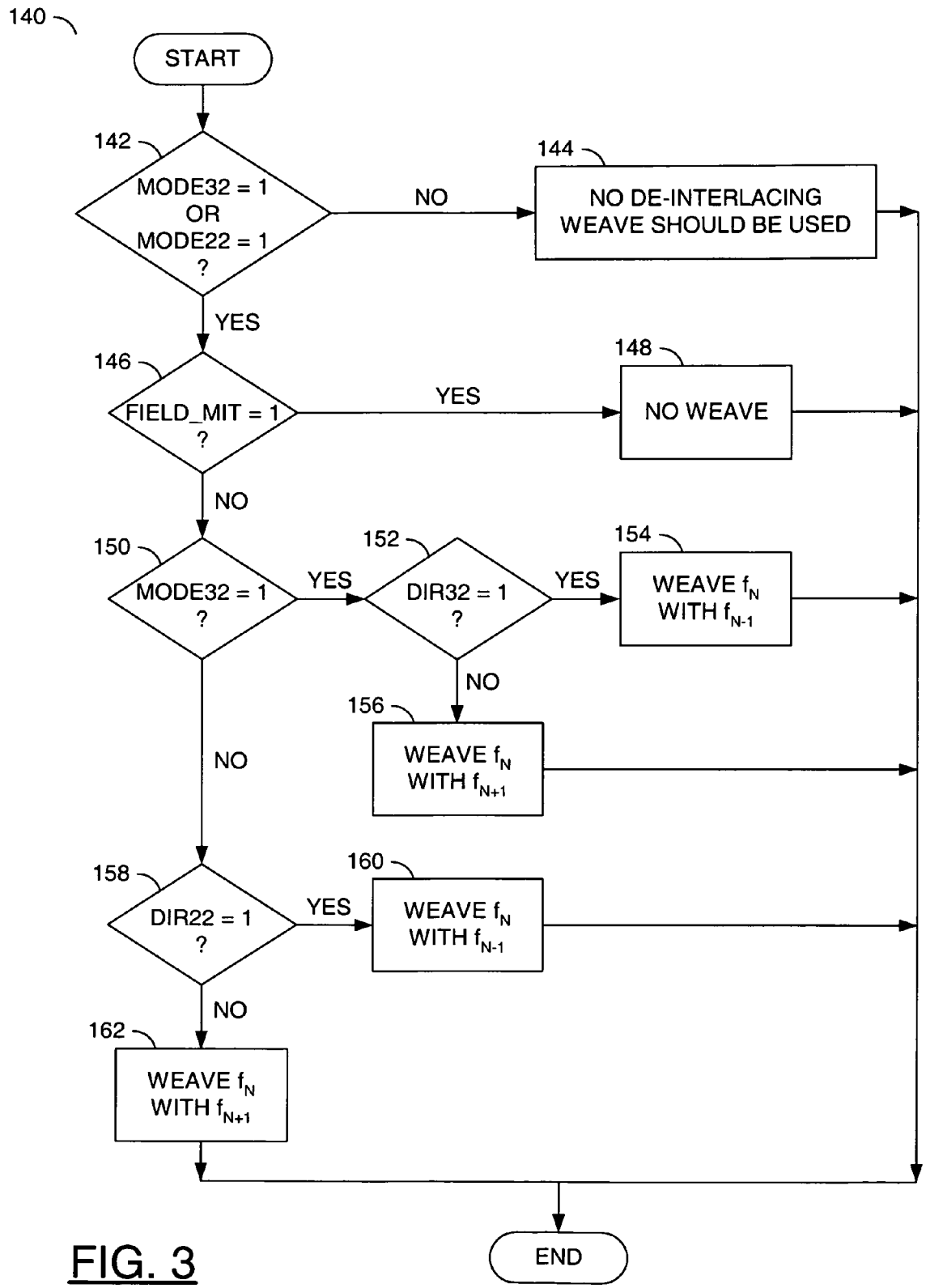
FIG. 3 is a flow diagram of an example implementation of a method for film mode decision making.

Referring to FIG. 3, a flow diagram of an example implementation of a method 140 for film mode decision making is shown. The method (or process) 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160 and a step (or block) 162.

The method 140 generally starts by checking if the flag MODE32 and/or the flag MODE22 are asserted in the step 142. If neither of the flags MODE32 and MODE22 are asserted (e.g., the NO branch of step 142), the decision presented in the step 144 may indicate that the interlaced fields are part of an original interlaced sequence (e.g., a non-telecine sequence) and thus the weave inverse telecine process should not be used. Furthermore, the non-telecine fields may be de-interlaced by the video output circuit 112 to generate progressive frames in the signal OUT.

If at least one of the flags MODE32 and MODE22 is asserted (e.g., the YES branch of the step 142), a check may be made of the flag FIELD_MIT in the step 146. If the flag FIELD_MIT is asserted to indicate moving interlaced text (e.g., the YES branch of step 146), the decision presented in the step 148 may indicate use of a non-weave inverse telecine process (e.g., the "bob" process). If the flag FIELD_MIT is de-asserted to indicate that no moving interlaced text was detected (e.g., the NO branch of the step 146), a check may be made of the flag MODE32 in the step 150.

If the flag MODE32 is de-asserted (e.g., the YES branch of the step 150), a check of the flag DIR32 may be performed in the step 152. If the flag DIR32 indicates the reverse direction (e.g., the YES branch of the step 152), the decision presented in the step 154 may indicate the weave inverse telecine process to combine the current field $f_N$ with the previous field $f_{N-1}$. If the flag DIR32 indicates the forward direction (e.g., the NO branch of the step 152), the decision presented in the step 156 may indicate the weave inverse telecine process to combine the current field $f_N$ with the next field $f_{N+1}$.

If the flag MODE32 is de-asserted (e.g., the NO branch of the step 150), a check of the flag DIR22 may be performed in the step 158. If the flag DIR22 indicates the reverse direction (e.g., the YES branch of the step 158), the decision presented in the step 160 may indicate use of the weave inverse telecine process to combine the current field $f_N$ with the previous field $f_{N-1}$. If the flag DIR22 indicates the forward direction (e.g., the NO branch of the step 158), the decision presented in the step 162 may indicate use of the weave inverse telecine process to combine the current field $f_N$ with the next field $f_{N+1}$. Further details of the decision making may be found in the co-pending U.S. patent application Ser. No. 11/314,631.

Figure 4:
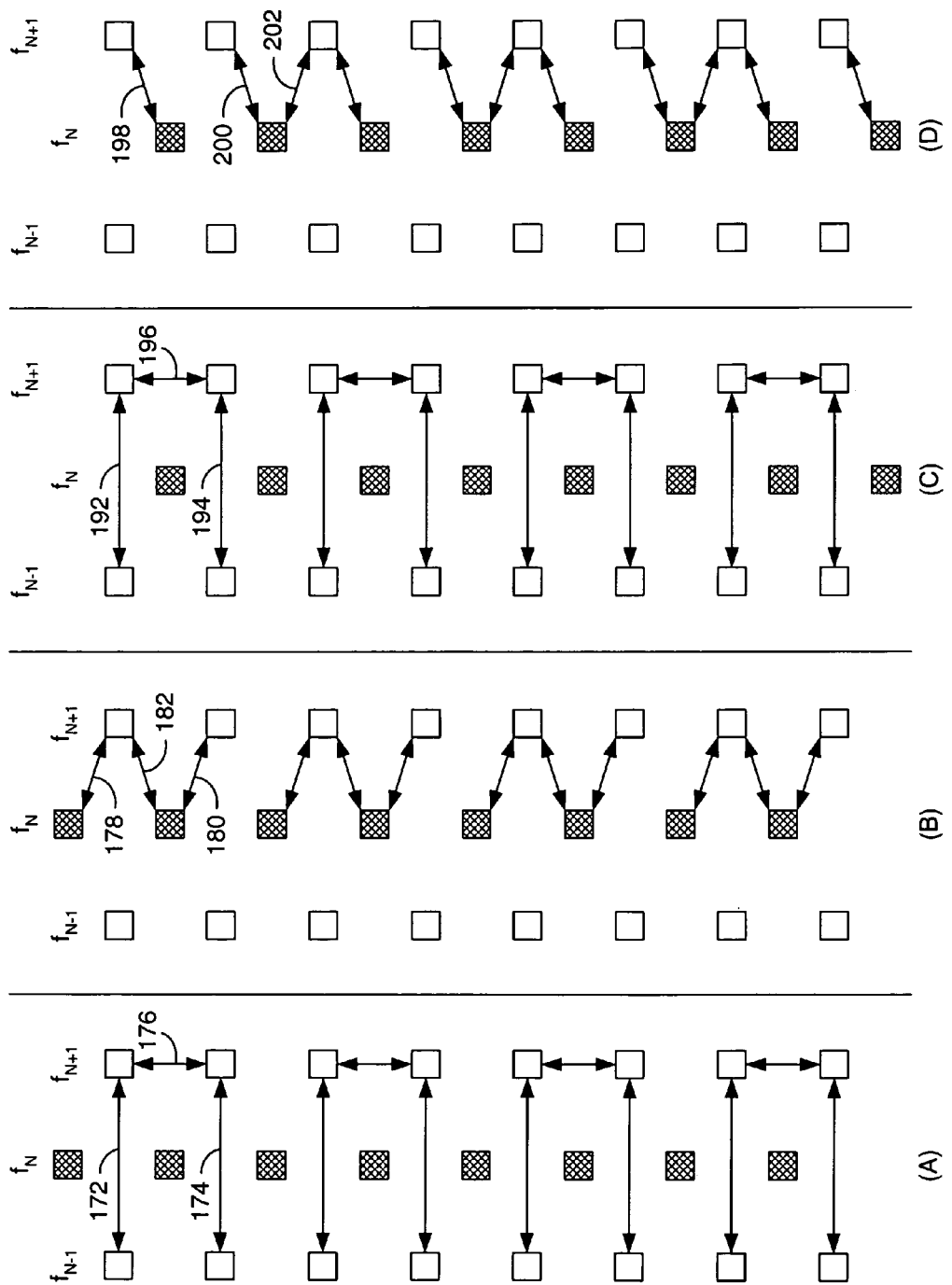
FIG. 4 is a diagram of an example sequence of video fields.

Referring to FIG. 4, a diagram of an example sequence 170 of video fields is shown. The video fields generally comprise alternating odd-parity fields and even-parity fields. The video fields may originate from a progressive source (e.g., film) interlaced through a telecine process or interlaced video.

Let $f_0, f_1, f_2, \ldots$ be a sequence of the video fields. For the purposes of discussion, the polarity of the first field $f_0$ is assumed to be known. Furthermore, a field $f_N$ may be referred to as a current field, a field $f_{N-1}$ may be referred to as a previous field (in time) and a field $f_{N+1}$ may be referred to as a next field (in time). In addition, the top-most line in a strip (or a field) may be conventionally considered an even line. Let a variable (e.g., CURRENT_STATE) represent the current status of a 2:2 pull-down detection. The variable CURRENT_STATE generally takes one of two values from a set {PROGRESSIVE, INTERLACED}.

Detection of progressive 2:2 pull-down material generally involves gathering of statistics both internal to the fields and from field-to-field. The VDSP module 110 may be operational to execute an instruction (e.g., abserr(IN0, IN1)) that may take two pel-strips, denoted as IN0 and IN1, as inputs and return the following four results:

|IN0 even−IN1 even|: the sum-of-absolute-differences (SAD) between the even lines co-located in IN0 and IN1.

|IN0 odd−IN1 odd|: the SAD between the odd lines co-located in IN0 and IN1.

|IN0 even−IN1 odd|: the SAD between the even lines in IN0 and the neighboring odd lines in IN1.

|IN0 odd−IN0 even|: the SAD between the odd lines in IN0 and the neighboring even lines in IN0.

In the unified approach to film mode decision, two abserr instructions may be used per block (e.g., 8×8 pixels) to gather the statistics used to check for the moving interlaced text. FIG. 4, columns (A) and (B) generally illustrate a first case when the current field $f_N$ is a top field. FIG. 4, columns (C) and (D) generally illustrate a second case when the current field $f_N$ is a bottom field.

The following two VDSP instructions may be issued for each 8×8 block in the first case where the current field $f_N$ is the top field:

$$\text{abserr}(IN0 = f_{N-1}, IN1 = f_{N+1}) \quad (1)$$

$$\text{abserr}(IN0 = f_{N+1}, IN1 = f_N) \quad (2)$$

From the first abserr in (1) above, the statistics obtained from (1) and (2) include, but are not limited to:

$$\text{SadPrevNext}[y][x] = |f_{N-1}\text{even} - f_{N+1}\text{even}| + |f_{N-1}\text{odd} - f_{N+1}\text{odd}| \quad (3)$$

where y and x generally define block indices in a vertical direction and a horizontal direction in the field, respectively. The value $|f_{N-1}\text{ even} - f_{N+1}\text{ even}|$ from (3) may be visualized as a difference between a previous field pixel and a next field pixel, see for example arrows 172 and 192. The value $|f_{N-1}\text{ odd} - f_{N+1}\text{ odd}|$ from (3) may be between a previous field pixel and a next field pixel, see for example arrows 174 and 194.

From the second abserr in (2) above, the following three statistics may be obtained:

$$\text{SadCurrNext1}[y][x] = |f_{N+1}\text{even} - f_N\text{even}| + |f_{N+1}\text{odd} - f_N\text{odd}| \quad (4)$$

$$\text{SadCurrNext2}[y][x] = |f_{N+1}\text{even} - f_N\text{odd}| * 2 \quad (5)$$

$$\text{VerAct2}[y][x] = |f_{N+1}\text{odd} - f_{N-1}\text{even}| * 2 \quad (6)$$

where in (5) and (6), the multiplicative factors of 2 may make the above four statistics (e.g., (3), (4), (5) and (6)) contain the same number of absolute differences. The value $|f_{N+1}\text{even} - f_N \text{even}|$ from (4) may be between a current field pixel and a next field pixel, see for example arrows 178 and 198. The value $|f_{N+1}\text{ odd} - f_N\text{ odd}|$ from (4) may be between a current field pixel and a next field pixel, see for example arrows 180 and 200. The value $|f_{N+1}\text{ even} - f_N\text{odd}|$ from (5) may be between a current field pixel and a next field pixel, see for example arrows 182 and 202. The value $|f_{N+1}\text{ odd} - f_{N+1}\text{ even}|$ from (6) may be between two next field pixels, see for example arrows 176 and 196.

In the above four statistics, the statistic SadPrevNext is generally a measure of the same-parity SAD. The statistics SadCurrNext1 and SadCurrNext2 are generally measures of opposite-parity SADs and may be thought of as frame vertical activities of the frame formed from weaving fields $f_N$ and $f_{N+1}$. The statistic VerAct2 is generally a measure of the field vertical activity of the bottom field $f_{N+1}$. The case where $f_N$ is a bottom field may be similar with the case where $f_N$ is a top field, except that the abserr instruction in (2) is replaced by the following:

$$\text{abserr}(\text{IN0} = f_N, \text{IN1} = f_{N+1}) \quad (7)$$

The difference may make |IN0 even–IN1 odd| meaningful as a measure of the frame vertical activity. Note that the abserr in (7) may also give the vertical activity of the bottom field $f_N$ from |IN0 odd–IN1 odd|. However, the vertical activity result is already available from processing the previous field $f_{N-1}$ (see arrow 176 in FIG. 4(A)). As such, the field vertical activities may be calculated only for bottom fields. Note also that in the stage of processing the current field $f_N$, the following statistics may be realized, not are not limited to:

SadPrevCurr1: similar to (4), but calculated from $f_{N-1}$ and $f_N$,

SadPrevCurr2: similar to (5), but calculated from $f_{N-1}$ and $f_N$,

VerAct1: similar to (6), but calculated from $f_{N-1}$ when $f_N$ is the top field and calculated from $f_{N-2}$ when $f_N$ is the bottom field.

Figure 5:
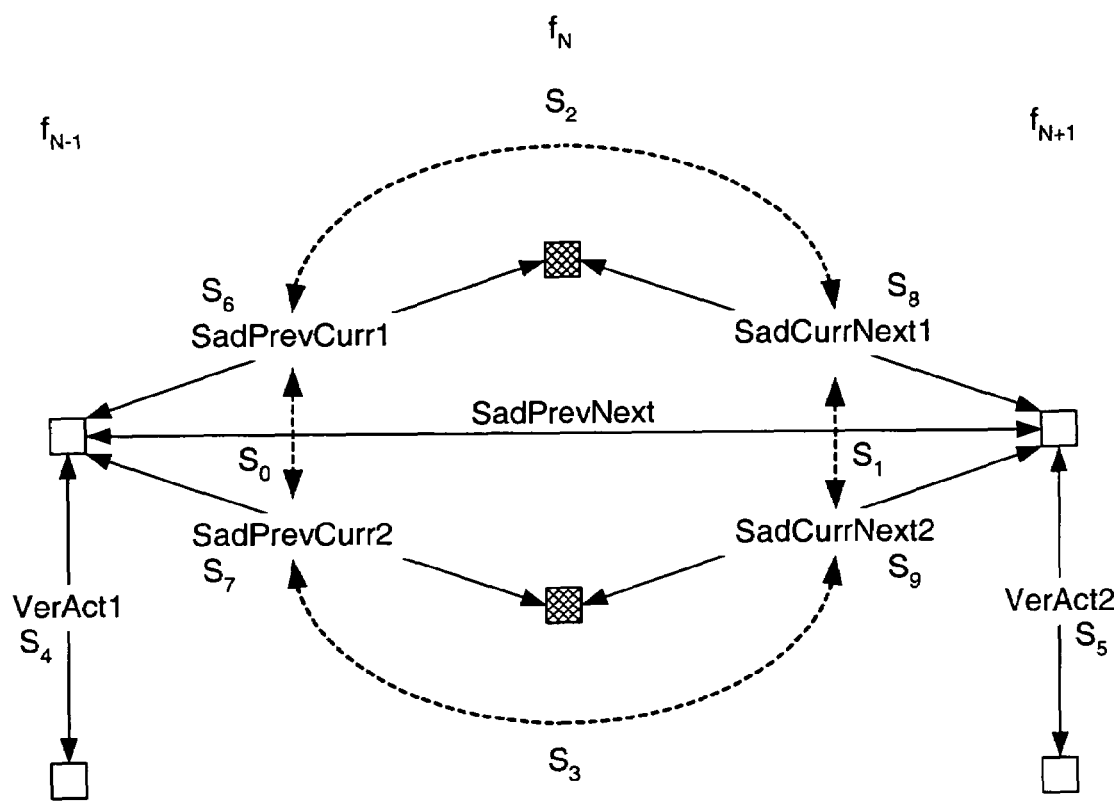
FIG. 5 is a diagram of a portion of several fields.

Referring to FIG. 5, a diagram of a portion of several fields is shown. Based on the above block statistics (1) through (7), the following field statistics (variables) may be defined:

$$S_0 = \sum_{y,x} |SadPrevCurr1[y][x] - SadPrevCurr2[y][x]| \quad (8)$$

$$S_1 = \sum_{y,x} |SadCurrNext1[y][x] - SadCurrNext2[y][x]| \quad (9)$$

$$S_2 = \sum_{y,x} |SadPrevCurr1[y][x] - SadCurrNext1[y][x]| \quad (10)$$

$$S_3 = \sum_{y,x} |SadPrevCurr2[y][x] - SadCurrNext2[y][x] - SadCurrNext2[y][x]| \quad (11)$$

$$S_4 = \sum_{y,x} VerAct1[y][x] \quad (12)$$

$$S_5 = \sum_{y,x} VerAct2[y][x] \quad (13)$$

$$S_6 = \sum_{y,x} SadPrevCurr1[y][x] \quad (14)$$

$$S_7 = \sum_{y,x} SadPrevCurr2[y][x] \quad (15)$$

$$S_8 = \sum_{y,x} SadCurrNext1[y][x] \quad (16)$$

$$S_9 = \sum_{y,x} SadCurrNext2[y][x] \quad (17)$$

In the above, all the summations may be over all of the blocks in a field. The relationships among the field statistics is generally illustrated in FIG. 5, for a case when $f_N$ is a top field.

A noise level (e.g., NOISE) for the current field $f_N$ may be estimated at the block level as the minimum of SadPrevNext [y] [x], excluding the blocks in the top row, bottom row, left-most column, and right-most column. The variable NOISE may be calculated as follows:

$$\text{NOISE} = \min_{\substack{0 < x < \frac{W}{8} - 1 \\ 0 < y < \frac{H}{8} - 1}} (SadPrevNext[y][x]) \quad (18)$$

where H is a field height and W is a field width of the input sequence. A variable (e.g., SadvarFlag) may be defined as the number of blocks (excluding the boundary blocks) with Sad-PrevNext greater than S*NOISE, where S is a constant (e.g., S=8). Such "noisy" blocks may be thought of as moving blocks.

A motion level estimation may be calculated for the current field $f_N$. According to SadPrevNext and the estimated noise level, the current field $f_N$ may be roughly categorized into one of three classes (e.g., fast motion, slow motion, and stationary). A variable (e.g., MOTION_LEVEL) may be defined in the following to indicate the three classes:

---

If there are > 128 non-boundary blocks with SadPrevNext > 1024 + NOISE, then MOTION_LEVEL = 0     // fast motion
  else if there are > 128 non-boundary blocks with SadPrevNext > 256 + NOISE, then MOTION_LEVEL = 1     // slow motion
  otherwise, MOTION_LEVEL = 2.     // stationary

---

A variable (e.g., SCENE_CHANGE) may be defined as a binary flag to indicate that the current field $f_N$ is involved in a scene change. The variable SCENE_CHANGE may be derived only when the current field $f_N$ is a top field as follows:

If $\min(S_4, S_5)*4 < \max(S_4, S_5)$, then SCENE_CHANGE=1;
else SCENE_CHANGE=0.

Note that the field statistics $S_4$ and $S_5$ are generally measures of the vertical activities of two consecutive bottom fields. If two consecutive bottom fields have dramatically different vertical activities, then a scene change has likely occurred between the two consecutive bottom fields.

Referring to FIG. 6, example pseudo code for determining how stationary a picture is in the current field $f_N$ is shown. A variable (e.g., CLOSE_TO_STATIONARY) is generally derived to indicate one among several stationary degrees (e.g., strong indication of stationary, weak indication of stationary, very weak indication of stationary and no indication of stationary). The variable CLOSE_TO_STATIONARY may be determined as shown FIG. 6. If the sequence is stationary from the previous field $f_{N-1}$ to the next field $f_{N+1}$, the field statistics $S_2$ and $S_3$ should small relative to $S_0$, $S_1$, $S_6$, $S_7$, $S_8$, and $S_9$.

Referring to FIG. 7, an example set of equations for calculating multiple intermediate variables used in a decision making process is shown. A first intermediate variable (e.g., INCONSIST[ ]) generally comprises a multi-entry (e.g., 4-entry) array. In FIG. 7, MXAINTER=$\max(|S_6-S_8|, |S_7-S_9|)$ and MNAINTER=$\min(|S_6-S_8|, |S_7-S_9|)$. The statistic $S_i^k$ is generally the statistics $S_i$ in processing the field $f_{N-k}$, for k=1, 2, 3, and 4. The variables MXAINTER$^k$ and MNAINTER$^k$ may be calculated from $S_i^k$. The function "sgn" is generally defined as sgn(x)=1 if x>0, sgn(x)=-1 if x<0, and sgn(0)=0. The terminology (top?1:-1) generally returns 1 if the current field is a top field and -1 if the current field is a bottom field.

Referring to FIG. 8, an example pseudo code for determining a direction variable (e.g., FORWARD) is shown. A variable (e.g., S_FORWARD) may be defined as a summation of several (e.g., 5) most recent values of FORWARD, including the current value.

Referring to FIG. 9, an example set of equations for calculating multiple interlacing indicators is shown. Four variables (e.g., IIND1, IIND2, IIND3, and IIND4) may derived as indicators of an interlacing sequence. Larger values of the indicators IIND1 through IIND4 generally indicate a greater likelihood that the current field $f_N$ originated as a normally interlaced field.

Considering the indicator IIND2 for an interlaced sequence, (i) the field statistics $S_6$ and $S_7$ should be very close to $S_8$ and $S_9$, (ii) a difference $S_0-S_1$ should have random signs in the most recent several (e.g., 5) fields and (iii) a difference $\max(S_6,S_7)-\max(S_8,S_9)$ should have random signs in the most recent several (e.g., 5) fields. In the indicator IIND3 for the interlaced sequence, (i) the field statistics $S_0$ and $S_1$ should be very close to each other and (ii) either IIND2==1 or $S_0$ and $S_1$ may be much smaller than $S_2$ and $S_3$. In the indicator IIND4 for the interlaced sequence, spatial (vertical) activities should be much less than temporal activities.

Referring to FIG. 10, an example set of equations for calculating multiple progressive indicators is shown. Four variables (e.g., PIND1, PIND2, PIND3 and PIND4) may be derived as indicators of a progressive sequence. Larger values of the indicators PIND1 through PIND4 generally indicate a greater likelihood that the current field $f_N$ originated from a progressive frame.

Referring to FIG. 11, an example pseudo code for deciding if the current field originated from a progressive material is shown. The variable PREV_PROGFWD may carry a value of a variable PROGFWD calculated in processing the previous field $f_{N-1}$. The mode flag MODE22 may be asserted/deasserted according to the state of the variable CURRENT_STATE. The direction flag DIR22 may be asserted/deasserted according to the variable PROGFWD.

Referring to FIGS. 12-14, tables of simulation results for the above 2:2 pull-down detection method are shown. The detection method (or process) is tested on 18 interlaced sequences and 18 progressive sequences. To test how fast the detection method locked to the correct mode, an initial state was set (i) to "PROGRESSIVE" for the interlaced sequences and (ii) to "INTERLACED" for the progressive sequences.

In the simulations, a "false negative" generally means that a field in a progressive sequence was improperly detected as an interlaced field. A "false positive" generally means that a field in an interlaced sequence was improperly detected as a field from a progressive frame. In FIGS. 12 and 13, the numbers of "false negatives" and "false positives" do not include the number of fields before the detection method is locked in the proper mode. Where the 2:2 pull-down detect method is applied in de-interlacing, a "false positive" may cause serious interlacing artifacts and thus should be avoid as much as possible. A "false negative" may cause some detail loss, but is more tolerable than a "false positive" in terms of visual effects.

In addition to the above 2:2 pull-down detection method, the system 100 may count (i) a number blocks with symmetric forward interlacing artifacts and backward interlacing artifacts, (ii) the number of blocks with only backward interlacing artifacts but without forward interlacing artifacts and (iii) the number of blocks with only forward interlacing artifacts but without backward interlacing artifacts. Decisions may then be based on comparisons of the three numbers. The counting may be applied where the block statistics are available. In another embodiment, the three numbers may be counted for block-rows, instead of blocks. Each of the block-rows may contain a number (e.g., 8) of pixel rows. The above may be applied where only row-based statistics are available.

The block-level statistics (e.g., SADs) may be readily computed/implemented in video display and/or compression systems for use in such purposes as 3:2 telecine detection, encoding block mode decision, rate-control and the like. By reusing the basic statistics, instead of explicitly detecting combing artifacts for a 2:2 pull-down detection, an overall system complexity may be reduced. A performance of the present invention may be outstanding, even on challenging material (e.g., extremely low motion, high vertical detail, low horizontal motion, etc.) Many of the challenging sequences are generally distinguished correctly even though the sequences have no discernable combing artifacts. As such, both encoding performance and/or display performance may be improved for the challenging sequences that could not be correctly identified by conventional methods.

The function performed by the flow diagrams, equations and pseudo code of FIGS. 3 and 6-11 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMs, EEPROMS, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for detecting progressive material in a video sequence, comprising the steps of:
   (A) calculating a plurality of block statistics for each of a plurality of blocks in a current field of said video sequence;
   (B) calculating a plurality of field statistics by summing said block statistics over all of said blocks in said current field;
   (C) calculating a noise level for said current field based on a subset of said block statistics from each of said blocks; and
   (D) generating a mode flag for said current field based on both (i) said field statistics and (ii) said noise level, wherein said mode flag identifies if said current field is part of a 2:2 pull-down pattern.

2. The method according to claim 1, further comprising the step of:
   calculating a motion level for said current field based on said subset of said block statistic from each of said blocks, wherein generation of said mode flag is further based on said motion level.

3. The method according to claim 2, further comprising the step of:
   calculating a stationary level for said current field based on said field statistics, wherein (i) said stationary level identifies a stillness in said current field and (ii) generation of said mode flag is further based on said stationary level.

4. The method according to claim 2, wherein (i) said noise for said current block comprises a minimum among a plurality of sums-of-absolute-differences between a plurality of co-located blocks in a previous field and a next field and (ii) said motion level is based on said sum-of-absolute-differences relative to a plurality of thresholds.

5. The method according to claim 1, further comprising the step of:
   generating a scene change flag for said current field based on a plurality of said field statistics, wherein (i) said scene change flag identifies if said current field is part of a scene change and (ii) generation of said mode flag is further based on said scene change flag.

6. The method according to claim 1, further comprising the step of:
   calculating a plurality of intermediate variables for said current field based on said field statistics.

7. The method according to claim 6, further comprising the step of:
   calculating a plurality of interlacing indicators for said current field based on both (i) said field statistics and (ii) said intermediate variables, wherein said interlacing indicators defining a probability that said current field is part of an interlacing sequence.

8. The method according to claim 6, further comprising the step of:
   calculating a plurality of progressive indicators for said current field based on both (i) said field statistics and (ii) said intermediate variables, wherein said progressive indicators defining a probability that said current field is part of a progressive sequence.

9. The method according to claim 1, wherein said block statistics comprise a same-parity sum-of-absolute-difference between two co-located areas, one each in a previous field and a next field.

10. The method according to claim 1, wherein said block statistics comprise two opposite-parity sum-of-absolute-differences between two co-located areas, one each in said current field and a next field.

11. A method for detecting progressive material in a video sequence, comprising the steps of:
    (A) calculating a plurality of block statistics for each of a plurality of blocks in a current field of said video sequence;
    (B) calculating a plurality of field statistics by summing said block statistics over all of said blocks in said current field;
    (C) calculating a motion level for said current field based on a subset of said block statistics from each of said blocks; and
    (D) generating a mode flag for said current field based on both (i) said field statistics and (ii) said motion level, wherein said mode flag identifies if said current field is part of a 2:2 pull-down pattern.

12. The method according to claim 11, further comprising the step of:
    calculating a noise level for said current field based on said subset of said block statistics from each of said blocks, wherein generation of said mode flag is further based on said noise level.

13. The method according to claim 11, further comprising the step of:
    calculating a stationary level for said current field based on said field statistics, wherein (i) said stationary level identifies a stillness in said current field and (ii) generation of said mode flag is further based on said stationary level.

14. The method according to claim 11, further comprising the step of:
    generating a scene change flag for said current field based on a plurality of said field statistics, wherein (i) said scene change flag identifies if said current field is part of a scene change and (ii) generation of said mode flag is further based on said scene change flag.

15. The method according to claim 11, further comprising the step of:
    calculating a plurality of intermediate variables for said current field based on said field statistics.

16. The method according to claim 15, further comprising the step of:
    calculating a plurality of interlacing indicators for said current field based on both (i) said field statistics and (ii) said intermediate variables, wherein said interlacing indicators define a probability that said current field is part of an interlacing sequence.

17. The method according to claim 15, further comprising the step of:
    calculating a plurality of progressive indicators for said current field based on both (i) said field statistics and (ii)

said intermediate variables, wherein said progressive indicators define a probability that said current field is part of a progressive sequence.

18. The method according to claim 11, wherein said block statistics comprise two measures of field vertical activity, one each in a previous field and a next field.

19. The method according to claim 11, wherein said block statistics comprise two opposite-parity sum-of-absolute-differences between two co-located areas, one each in said current field and a previous field.

20. A system comprising:
a memory configured to store a portion of a video sequence; and
a media processor configured to (A) calculate a plurality of block statistics for each of a plurality of blocks in a current field of said video sequence, (B) calculate a plurality of field statistics by summing said block statistics over all of said blocks in said current field, (C) calculate a noise level for said current field based on a subset of said block statistics from each of said blocks, (D) calculate a motion level for said current field based on said subset of said block statistics from each of said blocks and (E) generate a mode flag for said current field based on (i) said field statistics, (ii) said noise level and (iii) said motion level, wherein said mode flag identifies if said current field is part of a 2:2 pull-down pattern.

* * * * *